(12) United States Patent
Miyano et al.

(10) Patent No.: US 12,322,534 B2
(45) Date of Patent: *Jun. 3, 2025

(54) MAGNETIC SHEET, WOUND MAGNETIC SHEET, AND MULTILAYER MAGNETIC SHEET

(71) Applicant: Proterial, Ltd., Tokyo (JP)

(72) Inventors: Kouhei Miyano, Tokyo (JP); Yasuo Kuriyama, Tokyo (JP)

(73) Assignee: Proterial, Ltd., Tokyo (JP)

( * ) Notice: Subject to any disclaimer, the term of this patent is extended or adjusted under 35 U.S.C. 154(b) by 165 days.

This patent is subject to a terminal disclaimer.

(21) Appl. No.: 18/178,866

(22) Filed: Mar. 6, 2023

(65) Prior Publication Data

US 2023/0307162 A1    Sep. 28, 2023

(30) Foreign Application Priority Data

Mar. 28, 2022 (JP) ................. 2022-052070

(51) Int. Cl.
  B32B 7/12   (2006.01)
  B32B 3/18   (2006.01)
  (Continued)

(52) U.S. Cl.
  CPC ........... H01F 1/15333 (2013.01); B32B 3/18 (2013.01); B32B 7/12 (2013.01); H01F 27/245 (2013.01);
  (Continued)

(58) Field of Classification Search
  CPC ..... B32B 15/06; B32B 15/082; B32B 15/095; B32B 15/18; B32B 2250/42;
  (Continued)

(56) References Cited

U.S. PATENT DOCUMENTS

2007/0040643 A1    2/2007  Inoue et al.
2015/0123604 A1    5/2015  Lee et al.
(Continued)

FOREIGN PATENT DOCUMENTS

DE    10 2019 132 543 A1    6/2021
JP    2001053485 A    2/2001
(Continued)

OTHER PUBLICATIONS

Extended European Search Report dated Aug. 4, 2023, for corresponding European Application No. 23159619.8.

*Primary Examiner* — Lawrence D Ferguson
(74) *Attorney, Agent, or Firm* — David D. Brush; Westman, Champlin & Koehler, P.A.

(57) ABSTRACT

A magnetic sheet includes an adhesive layer that includes a support formed in a band shape and an adhesive provided on at least one of a first surface or a second surface of the support, and a magnetic ribbon that is formed in a band shape using a magnetic material and is bonded to the adhesive on the adhesive layer. Width A as a dimension of the adhesive layer in a direction intersecting a longitudinal direction of the adhesive layer and width B as a dimension of the magnetic ribbon in a direction intersecting a longitudinal direction of the magnetic ribbon satisfy a relationship of 0.2 mm≤(width A−width B)≤3 mm.

10 Claims, 14 Drawing Sheets

(51) Int. Cl.
| | |
|---|---|
| *H01F 1/153* | (2006.01) |
| *H01F 27/245* | (2006.01) |
| *B32B 9/04* | (2006.01) |
| *B32B 15/06* | (2006.01) |
| *B32B 15/082* | (2006.01) |
| *B32B 15/095* | (2006.01) |
| *B32B 15/18* | (2006.01) |
| *B32B 27/08* | (2006.01) |
| *B32B 27/28* | (2006.01) |
| *B32B 27/30* | (2006.01) |
| *B32B 27/32* | (2006.01) |
| *B32B 27/34* | (2006.01) |
| *B32B 27/36* | (2006.01) |
| *B32B 27/40* | (2006.01) |

(52) U.S. Cl.
CPC .............. *B32B 9/045* (2013.01); *B32B 15/06* (2013.01); *B32B 15/082* (2013.01); *B32B 15/095* (2013.01); *B32B 15/18* (2013.01); *B32B 27/08* (2013.01); *B32B 27/281* (2013.01); *B32B 27/283* (2013.01); *B32B 27/285* (2013.01); *B32B 27/286* (2013.01); *B32B 27/302* (2013.01); *B32B 27/304* (2013.01); *B32B 27/306* (2013.01); *B32B 27/308* (2013.01); *B32B 27/32* (2013.01); *B32B 27/34* (2013.01); *B32B 27/36* (2013.01); *B32B 27/365* (2013.01); *B32B 27/40* (2013.01); *B32B 2250/42* (2013.01); *B32B 2307/208* (2013.01); *B32B 2307/704* (2013.01)

(58) Field of Classification Search
CPC ........ B32B 2307/208; B32B 2307/704; B32B 27/08; B32B 27/281; B32B 27/283; B32B 27/285; B32B 27/286; B32B 27/302; B32B 27/304; B32B 27/306; B32B 27/308; B32B 27/32; B32B 27/34; B32B 27/36; B32B 27/365; B32B 27/40; B32B 3/18; B32B 7/12; B32B 9/045; H01F 1/15333; H01F 1/15375; H01F 27/245; H01F 27/366; H01F 3/02; H01F 3/04; H01F 41/024
See application file for complete search history.

(56) References Cited

U.S. PATENT DOCUMENTS

| | | |
|---|---|---|
| 2015/0342099 A1 | 11/2015 | Jang et al. |
| 2018/0352688 A1 | 12/2018 | Jang et al. |
| 2019/0296432 A1* | 9/2019 | Lim ................ B32B 15/08 |
| 2020/0377981 A1 | 12/2020 | Itagaki et al. |
| 2022/0293313 A1 | 9/2022 | Kuriyama |

FOREIGN PATENT DOCUMENTS

| | | |
|---|---|---|
| JP | 2005203564 A | 7/2005 |
| JP | 2008112830 A | 5/2008 |
| JP | 2015505166 A | 2/2015 |
| WO | 2010140367 A1 | 12/2010 |
| WO | 2020235642 A1 | 11/2020 |

* cited by examiner

A-A

B-B

C-C

E-E

MAGNETIC SHEET, WOUND MAGNETIC SHEET, AND MULTILAYER MAGNETIC SHEET

CROSS-REFERENCE TO RELATED APPLICATIONS

This application claims the benefit of Japanese Patent Application No. 2022-052070 filed on Mar. 28, 2022 with the Japan Patent Office, the disclosure of which is incorporated herein by reference.

BACKGROUND

The present disclosure relates to a magnetic sheet, a wound magnetic sheet, and a multilayer magnetic sheet used for a magnetic core, an inductor, a magnetic shield, and the like.

In recent years, contactless charging has attracted attention in which a transmission coil is provided on both a power supply side and a power reception side and charging is performed by power transmission using electromagnetic induction. In the contactless charging, the magnetic flux generated in a primary transmission coil of a power feeding device generates electromotive force in a secondary transmission coil of a power receiving device via housings of the power feeding device and the power receiving device. As a result, power is supplied.

For example, contactless charging has been spreading to electronic devices such as a tablet information terminal, a music player, a smartphone, and a mobile phone. Contactless charging is a technology applicable to, for example, electronic devices other than the above, electric vehicles, drones, forklifts, transport vehicles such as AGVs (Automated Guided Vehicles), railways, trams, and the like.

In order to increase power transmission efficiency in contactless charging, a magnetic sheet may be disposed as a coil yoke on the transmission coil on the side opposite to the contact surface with the power feeding device or the power receiving device. The magnetic sheet disposed as described above functions as a magnetic shielding material for preventing leakage of magnetic flux during charging, as a yoke member for refluxing magnetic flux generated in a coil during charging, or the like.

As a method for manufacturing the magnetic sheet described above, various methods have been proposed. For example, Japanese Unexamined Patent Application Publication No. 2008-112830, Japanese Translation of PCT International Application Publication No. 2015-505166, and WO 2020/235642 disclose a manufacturing method including a step of dividing a sheet-like magnetic body included in a magnetic sheet, a ribbon formed of a non-crystalline alloy or a nanocrystalline grain alloy, or the like (hereinafter, also referred to as "alloy ribbon") into a plurality of pieces. This step is performed for the purpose of improving a Q factor or reducing eddy current loss.

SUMMARY

In the manufacturing methods described in the above publications, small pieces obtained by dividing an alloy ribbon are bonded to an adhesive layer provided in a magnetic sheet and held thereon. However, if there is a small piece that is not bonded to the adhesive layer, there may be a problem that the small piece falls off from the magnetic sheet.

The present disclosure preferably provides a magnetic sheet, a wound magnetic sheet, and a multilayer magnetic sheet capable of suppressing falling off of small pieces.

A magnetic sheet according to a first aspect of the present disclosure includes an adhesive layer and a magnetic ribbon. The adhesive layer includes a support formed in a band shape and an adhesive provided on at least one of a first surface or a second surface of the support. The magnetic ribbon is formed in a band shape using a magnetic material. The magnetic ribbon is bonded to the adhesive on the adhesive layer. Width A as a dimension of the adhesive layer in a direction intersecting a longitudinal direction of the adhesive layer and width B as a dimension of the magnetic ribbon in a direction intersecting a longitudinal direction of the magnetic ribbon satisfy a relationship of 0.2 mm≤(width A−width B)≤3 mm.

A wound magnetic sheet according to a second aspect of the present disclosure is formed by winding the magnetic sheet according to the first aspect in a ring shape or a spiral shape.

A multilayer magnetic sheet according to a third aspect of the present disclosure includes adhesive layers and magnetic ribbons. Each of the adhesive layers includes a support formed in a band shape and an adhesive provided on a first surface and a second surface of the support. Each of the magnetic ribbons is formed in a band shape using a magnetic material. Each of the magnetic ribbons is disposed between the adhesive layers adjacent to each other to be bonded to the adhesive on each of the adhesive layers. Width A as a dimension of the adhesive layers in a direction intersecting a longitudinal direction of the adhesive layers and width B as a dimension of the magnetic ribbons in a direction intersecting a longitudinal direction of the magnetic ribbons satisfy a relationship of 0.2 mm≤(width A−width B)≤3 mm.

According to the magnetic sheet of the first aspect of the present disclosure, the wound magnetic sheet of the second aspect of the present disclosure, and the multilayer magnetic sheet of the third aspect of the present disclosure, the width A of the area of the adhesive layer where the adhesive is provided is wider than the width B of the magnetic ribbon. Even if meandering occurs in the adhesive layer or the magnetic ribbon when the magnetic ribbon is bonded to the adhesive layer, the adhesive of the adhesive layer is easily disposed on the entire surface of the magnetic ribbon.

By setting the value (width A−width B) obtained by subtracting the width B from the width A to 0.2 mm or more, it is easy to prevent the occurrence of a portion where the adhesive is not disposed on the magnetic ribbon when the magnetic ribbon is bonded to the adhesive layer. By setting the value (width A−width B) obtained by subtracting the width B from the width A to 3 mm or less, it is easy to prevent the portion of the magnetic sheet where the magnetic ribbon is not disposed from becoming large. In addition, when the magnetic sheets are arranged in parallel, it is easy to prevent the distance (the magnetic gap) between the magnetic ribbons from increasing.

According to the magnetic sheet, the wound magnetic sheet, and the multilayer magnetic sheet of the present disclosure, the adhesive of the adhesive layer is easily disposed on the entire surface of the magnetic ribbon. Furthermore, it is possible to easily suppress falling off of small pieces formed by cracking an alloy ribbon.

BRIEF DESCRIPTION OF THE DRAWINGS

An example embodiment of the present disclosure will be described below with reference to the accompanying drawings, in which.

DETAILED DESCRIPTION OF EXEMPLARY EMBODIMENTS

A magnetic sheet 100, a wound magnetic sheet 200, a multilayer magnetic sheet 300, and a multilayer magnetic sheet 300T according to an embodiment of the present disclosure are used for a contactless charging device. These sheets may be used, for example, in a power feeding device of a charging device or in a power receiving device of a charging device.

The multilayer magnetic sheet 300 has a configuration in which a plurality of the magnetic sheets 100 are layered. The wound magnetic sheet 200 has a shape in which the magnetic sheet 100 is wound. In the present embodiment, an example will be described in which the multilayer magnetic sheet 300 and the multilayer magnetic sheet 300T are used for contactless charging of a device with higher power consumption than an information processing device such as a smartphone or an electronic device. An example will be described in which the multilayer magnetic sheet 300T is used for contactless charging of a moving body such as an automobile. The multilayer magnetic sheet 300, the multilayer magnetic sheet 300T, and the magnetic sheet 100 may be used, for example, for contactless charging of an information processing device, an electronic device, or the like.

Figure 1:
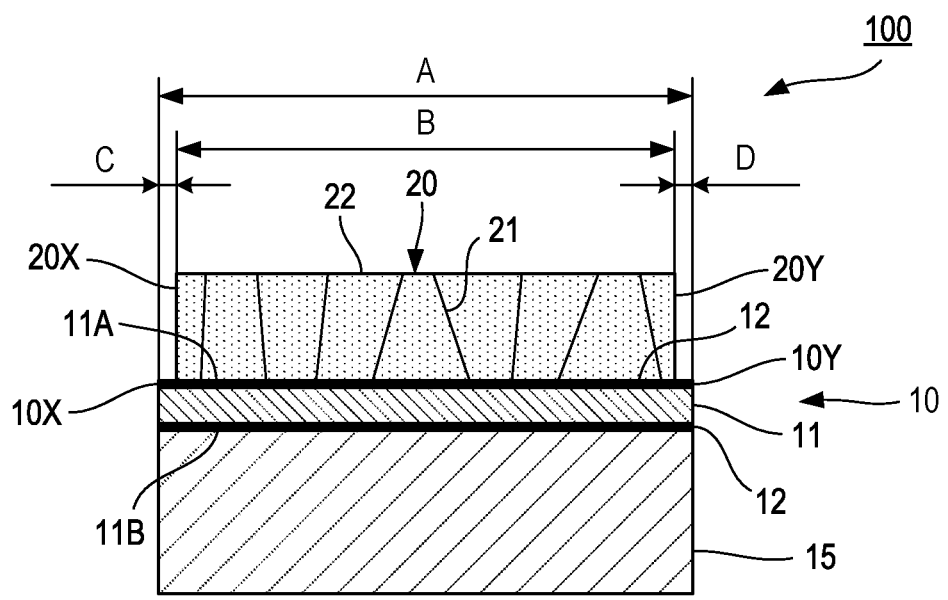
FIG. 1 is a cross-sectional view of a magnetic sheet cut along a width direction for explaining a structure of the magnetic sheet according to the present disclosure.

FIG. 1 is a cross-sectional view of the magnetic sheet 100 cut along a width direction for explaining a structure of the magnetic sheet 100.

The magnetic sheet 100 is a sheet constituting the wound magnetic sheet 200, the multilayer magnetic sheet 300, and the multilayer magnetic sheet 300T. As illustrated in FIG. 1, the magnetic sheet 100 has a configuration in which one adhesive layer 10, one resin sheet 15, and one magnetic ribbon 20 are layered.

The adhesive layer 10 is a member to which the magnetic ribbon 20 is bonded. The adhesive layer 10 is a member formed in an elongated shape. The adhesive layer 10 is, for example, a film-shaped member formed in a rectangular shape. The adhesive layer 10 mainly includes a support 11 and an adhesive 12.

The support 11 is a band-like and film-shaped member formed in an elongated shape. The support 11 is, for example, a film-shaped member formed in a rectangular shape. The support 11 is formed using a flexible resin material. As the resin material, for example, polyethylene terephthalate (PET) can be used.

The adhesive 12 is provided in a film shape or a layer shape on a first surface 11A and a second surface 11B of the support 11. In the present embodiment, an example will be described in which the first surface 11A is a surface of the film-shaped support 11 facing the magnetic ribbon 20, and the second surface 11B is a surface opposite to the first surface 11A.

As the adhesive 12, for example, a pressure-sensitive adhesive can be used. For example, a known adhesive such as an acrylic adhesive, a silicone-based adhesive, a urethane-based adhesive, a synthetic rubber, or a natural rubber can be used as the adhesive 12. The acrylic adhesive is preferable as the adhesive 12 because the acrylic adhesive is excellent in thermal resistance and moisture resistance and has a wide range of materials that can be bonded.

The adhesive 12 is provided in a layer shape on the first surface 11A and the second surface 11B of the support 11. In the present embodiment, an example will be described in which the adhesive 12 is provided on the entire surfaces of the first surface 11A and the second surface 11B of the support 11.

Figure 2:
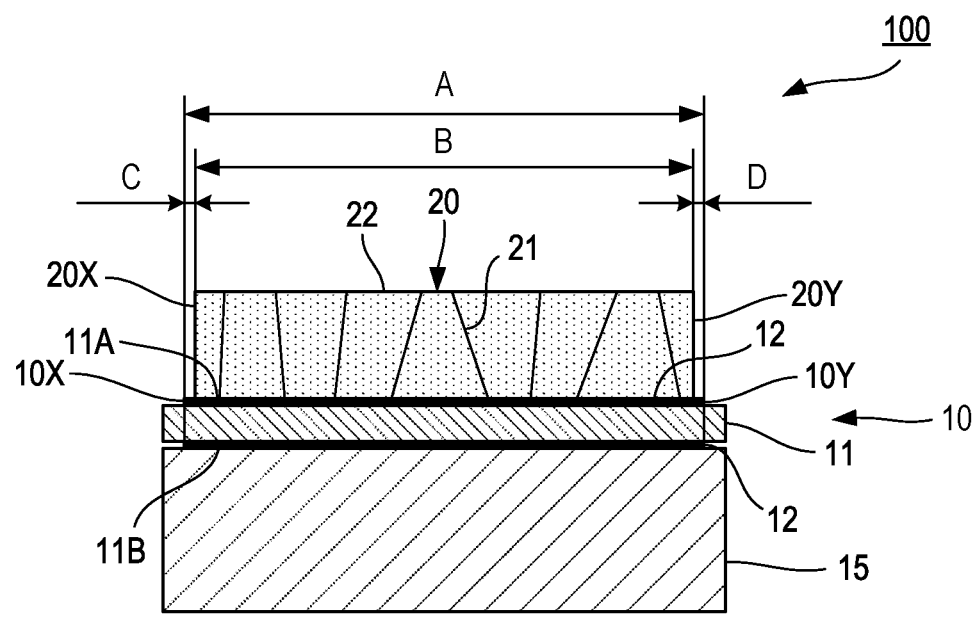
FIG. 2 is a cross-sectional view illustrating another example of an area where an adhesive is provided.

FIG. 2 is a cross-sectional view illustrating another example of an area where the adhesive 12 is provided.

The area where the adhesive 12 is provided on the first surface 11A and the second surface 11B of the support 11 does not need to be the entire surface of the first surface 11A and the second surface 11B, for example, as illustrated in FIG. 2. For example, the adhesive 12 does not need to be provided at end portions of the first surface 11A and the second surface 11B in a width direction.

For example, the second surface 11B instead of the first surface 11A may be a surface facing the magnetic ribbon 20. For example, the adhesive 12 may be provided only on a surface facing the magnetic ribbon 20 among the first surface 11A and the second surface 11B of the support 11.

As illustrated in FIG. 1, the resin sheet 15 is a film-shaped member formed using a resin. The resin sheet 15 is a member also referred to as a protective film, a release film, or a liner. The resin sheet 15 is a member used to protect the magnetic sheet 100 (including the wound magnetic sheet 200, and the multilayer magnetic sheet 300).

The resin sheet 15 functions to suppress an unnecessary increase in a crack 21 (or a crack connecting a plurality of cracks 21 in a mesh shape) to be described later due to application of an unintended external force to the magnetic ribbon 20. The resin sheet 15 also functions to suppress falling off of small pieces 22 of the magnetic ribbon 20 and to suppress rusting of the magnetic ribbon 20.

Furthermore, the resin sheet 15 functions to suppress the occurrence of unnecessary deformation when the magnetic sheet 100 (including the wound magnetic sheet 200 and the multilayer magnetic sheet 300) is processed into a predetermined shape. Examples of the unnecessary deformation include surface irregularities. For example, the resin sheet 15 may be layered together with the adhesive layer 10 as described above, or may be layered alone.

The resin sheet 15 is preferably a film-shaped member formed using a resin, and more preferably a member formed using a resin with elasticity. In a case where the resin sheet 15 is a member formed using a resin, the generation of irregularities on the surface of the magnetic ribbon 20 is easily suppressed by the elastic force of the resin sheet 15. Even if irregularities are generated on the surface of the magnetic ribbon 20, the irregularities of the magnetic ribbon 20 are likely to be flattened by the elastic force of the resin sheet 15. The surface state of the magnetic ribbon 20 can be an excellent state with less irregularities. The temporal change of the magnetic characteristics in the magnetic sheet 100 tends to be small.

For the resin sheet 15, for example, a resin having a lower limit of a tensile elastic modulus of 0.1 GPa can be used. In a case where the tensile elastic modulus of the resin is equal to or more than 0.1 GPa, the above effects are easily obtained sufficiently. The lower limit of the tensile elastic modulus is preferably 0.5 GPa, and more preferably 1.0 GPa.

The upper limit of the tensile elastic modulus of the resin is preferably 10 GPa. In a case where the tensile elastic modulus of the resin exceeds 10 GPa, deformation of the alloy ribbon may be suppressed when the crack 21 to be described later is formed. The upper limit of the tensile elastic modulus is preferably 9 GPa, and more preferably 8 GPa.

The thickness of the resin sheet 15 is preferably equal to or more than 1 μm and equal to or less than 100 μm. When the thickness of the resin sheet 15 increases, the magnetic sheet 100 is less likely to be deformed. It may be difficult to dispose the magnetic sheet 100 along a curved surface or a bent surface.

When the thickness of the resin sheet 15 is less than 1 μm, the resin sheet 15 is easily deformed. It becomes difficult to handle the resin sheet 15, and the function of supporting the magnetic ribbon 20 by the resin sheet 15 may not be sufficiently exhibited. In a case where the resin sheet 15 is a protective film, the strength of the resin sheet 15 becomes weak, and the function of protecting the magnetic ribbon 20 and the like may not be sufficient.

For the resin sheet 15, for example, polyethylene terephthalate (PET), polyamide, polyimide, polyetherimide, polyethylene naphthalate, polypropylene, polyethylene, polystyrene, polycarbonate, polysulfone, polyetherketone, polyvinyl chloride, polyvinyl alcohol, a fluororesin, an acrylic resin, cellulose, and the like can be used as the resin. Polyamide and polyimide are particularly preferable as the resin for forming the resin sheet 15 from the viewpoint of thermal resistance and dielectric loss.

The magnetic ribbon 20 is a ribbon formed in an elongated band shape using a magnetic material. The crack 21 is formed in the magnetic ribbon 20. The magnetic ribbon 20 is divided into a plurality of small pieces 22 by the crack 21. In other words, the magnetic ribbon 20 includes a plurality of small pieces 22. The crack 21 refers to a magnetic gap formed in the magnetic ribbon 20. The crack 21 includes, for example, a breakage and/or a crack of the magnetic ribbon 20.

By forming the crack 21 in the magnetic ribbon 20, the Q value can be easily improved in a case where the magnetic sheet 100 is used as a magnetic body for an inductor. In a case where the magnetic sheet 100 is used as a magnetic body for magnetic shielding, it is easy to divide the current path of the magnetic ribbon 20 to reduce the eddy current loss.

As a material for forming the magnetic ribbon 20, for example, an alloy having an alloy composition of a Fe-base or a Co-base can be used, and a nanocrystalline alloy or an amorphous alloy can also be used. The magnetic ribbon 20 is particularly preferably a ribbon formed using a nanocrystalline alloy as a material (hereinafter, also referred to as "nanocrystalline alloy ribbon").

As the nanocrystalline alloy ribbon, for example, a nanocrystalline alloy ribbon obtained by performing a thermal treatment for nanocrystallization on a non-crystalline alloy ribbon capable of nanocrystallization can be used. At the time of the heat treatment for nanocrystallization, it is preferable to perform the heat treatment for nanocrystallization in a state where tension is applied to the non-crystalline alloy ribbon capable of nanocrystallization. The ribbon formed using an amorphous alloy as a material is also referred to as an amorphous alloy ribbon or a non-crystalline alloy ribbon.

The nanocrystalline alloy ribbon preferably has a composition represented by the following general formula.

General Formula: $(Fe_{1-a}M_a)_{100-x-y-z-\alpha-\beta-\gamma}Cu_xSi_yB_zM'_\alpha M''_\beta X_\gamma$ (atomic %)

In the above general formula, M is Co and/or Ni, M' is at least one element selected from the group consisting of Nb, Mo, Ta, Ti, Zr, Hf, V, Cr, Mn, and W, M'' is at least one element selected from the group consisting of Al, a platinum group element, Sc, a rare earth element, Zn, Sn, and Re, X is at least one element selected from the group consisting of C, Ge, P, Ga, Sb, In, Be, and As, and a, x, y, z, α, β, and γ satisfy $0 \leq a \leq 0.5$, $0.1 \leq x \leq 3$, $0 \leq y \leq 30$, $0 \leq z \leq 25$, $5 \leq y+z \leq 30$, $0 \leq \alpha \leq 20$, $0 \leq \beta \leq 20$, and $0 \leq \gamma \leq 20$, respectively.

Preferably, in the general formula, a, x, y, z, α, β, and γ satisfy $0 \leq a \leq 0.1$, $0.7 \leq x \leq 1.3$, $12 \leq y \leq 17$, $5 \leq z \leq 10$, $1.5 \leq \alpha \leq 5$, $0 \leq \beta \leq 1$, and $0 \leq \gamma \leq 1$, respectively.

In the present embodiment, an example of a ribbon (FT-3 manufactured by Hitachi Metals, Ltd.) in which the magnetic ribbon 20 is a Fe-Cu-Nb-Si-B based nanocrystalline alloy will be described. The magnetic ribbon 20 may be, for example, a nanocrystalline alloy ribbon having another composition represented by the above general formula or an amorphous alloy ribbon.

In a case where the magnetic ribbon 20 is a nanocrystalline alloy ribbon, the magnetic ribbon 20 is mechanically more brittle than that in a case where the magnetic ribbon is an amorphous alloy ribbon. In a case where the magnetic ribbon 20 is a nanocrystalline alloy ribbon, when an external force is directly applied to the magnetic ribbon 20 to form the crack 21, the crack 21 can be formed with a small external force.

In a case where the magnetic ribbon 20 is a nanocrystalline alloy ribbon, the crack 21 can be formed without substantially forming irregularities on the surface of the magnetic ribbon 20. Therefore, the surface state of the magnetic ribbon 20 can be an excellent state. The temporal change of the shape of the magnetic ribbon 20 generated after the magnetic ribbon 20 and the adhesive layer 10 are bonded to each other to form the magnetic sheet 100 is reduced. It is possible to suppress a temporal change in magnetic characteristics in the magnetic sheet 100 and the magnetic ribbon 20.

As the magnetic ribbon 20, for example, an alloy ribbon manufactured by roll cooling and having a thickness of 100 μm or less can be used. The thickness of the magnetic ribbon 20 is preferably equal to or less than 50 μm, more preferably equal to or less than 30 μm, still more preferably equal to or less than 25 μm, and particularly preferably equal to or less than 20 μm. In a case where the thickness is thin, it tends to be difficult to handle the magnetic ribbon 20, and thus the thickness of the magnetic ribbon 20 is preferably equal to or more than 5 μm, and more preferably equal to or more than 10 μm.

The magnetic ribbon 20 is bonded to the adhesive 12 of the adhesive layer 10. In the present embodiment, the magnetic ribbon 20 is bonded to the adhesive 12 provided on the first surface 11A of the adhesive layer 10. The magnetic ribbon 20 has a shape in which the magnetic ribbon 20 and the adhesive layer 10 satisfy the relationship represented by the following formula.

$$0.2 \text{ mm} \leq (\text{width A} - \text{width B}) \leq 3 \text{ mm}$$

The width A is a dimension related to the adhesive layer 10. The width A is more preferably a dimension related to an area of the adhesive layer 10 where the adhesive 12 to which the magnetic ribbon 20 is bonded is provided. The width B is a dimension related to the magnetic ribbon 20. In a case where the adhesive 12 is provided on the entire surface of the support 11 of the adhesive layer 10, the width A is a dimension related to the adhesive layer 10 or the support 11.

The lower limit of "width A–width B" is preferably 0.5 mm, and more preferably 1.0 mm. The upper limit of "width A–width B" is preferably 2.5 mm, and more preferably 2.0 mm.

The magnetic ribbon 20 and the adhesive layer 10 are arranged so as to satisfy the relationship represented by another following formula.

$$0 \text{ mm} < \text{gap C and } 0 \text{ mm} < \text{gap D}$$

The gap C and the gap D are distances from the end portion of the adhesive layer 10 to the end portion of the magnetic ribbon 20. Specifically, the gap C is a distance from a first adhesive layer end portion 10X of the adhesive layer 10 to a first ribbon end portion 20X of the magnetic ribbon 20. The gap D is a distance from a second adhesive layer end portion 10Y of the adhesive layer 10 to a second ribbon end portion 20Y of the magnetic ribbon 20.

The first ribbon end portion 20X is an end portion of the magnetic ribbon 20 on the same side as the first adhesive layer end portion 10X. The second adhesive layer end portion 10Y is an end portion of the adhesive layer 10 opposite to the first adhesive layer end portion 10X. The second ribbon end portion 20Y is an end portion of the magnetic ribbon 20 on the same side as the second adhesive layer end portion 10Y.

The width A, the width B, the gap C, and the gap D extend in a direction intersecting the longitudinal direction of the magnetic sheet 100. More preferably, these are dimensions in a direction orthogonal to the longitudinal direction of the magnetic sheet 100. The longitudinal direction of the magnetic sheet 100 and the longitudinal direction of the adhesive layer 10 are the same direction. The longitudinal direction of the magnetic sheet 100 and the longitudinal direction of the magnetic ribbon 20 are the same direction.

In the present embodiment, an example in which the length of the magnetic ribbon 20 in the longitudinal direction is 20,000 m will be described. An example in which the width A, which is a dimension related to the adhesive layer 10 or the support 11, is 32 mm, the width B, which is a dimension related to the magnetic ribbon 20, is 30 mm, and "width A–width B" is 2 mm will be described.

The length of the magnetic sheet 100 in the longitudinal direction is, for example, 20,000 m. The width of the magnetic sheet 100 is, for example, 32 mm. The length of the magnetic sheet 100 in the longitudinal direction may be, for example, longer or shorter than 20,000 m. The width of the magnetic sheet 100 may be, for example, wider or narrower than 32 mm. The length of the magnetic sheet 100 in the longitudinal direction may be set to a desired length depending on a use state. For example, the magnetic sheet 100 may be cut to a necessary length such as 100 mm, 300 mm, or 1000 mm.

Figure 3:
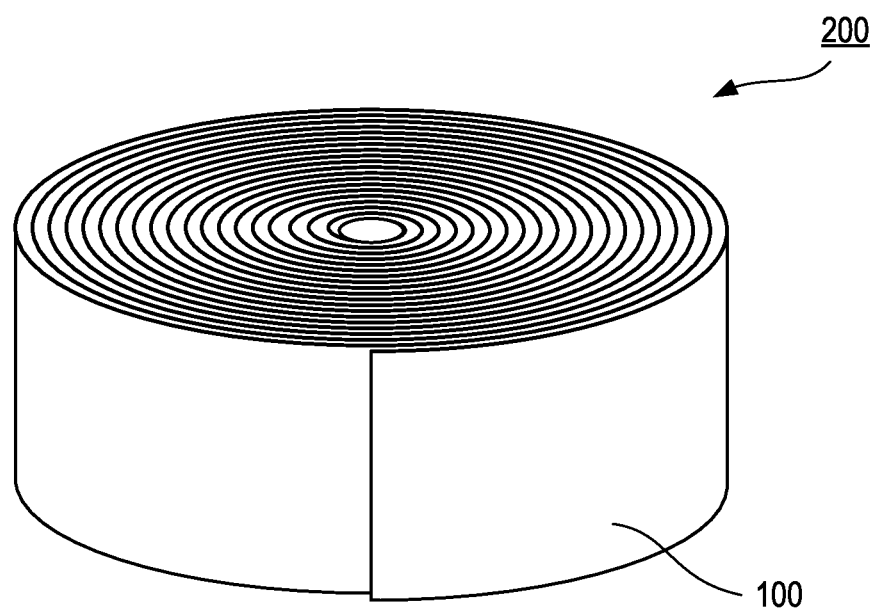
FIG. 3 is a schematic view illustrating a shape of a wound magnetic sheet.

FIG. 3 is a schematic view illustrating a shape of the wound magnetic sheet 200 of the present embodiment.

The wound magnetic sheet 200 has a shape in which the magnetic sheet 100 formed in an elongated band shape is wound in a ring shape or a spiral shape as illustrated in FIG. 3. The outer shape of the wound magnetic sheet 200 is cylindrical.

The length of the wound magnetic sheet 200 in the longitudinal direction is, for example, 20,000 m. The width of the wound magnetic sheet 200 is, for example, 32 mm. The length of the wound magnetic sheet 200 in the longitudinal direction may be, for example, longer or shorter than 20,000 m. The width of the wound magnetic sheet 200 may be, for example, wider or narrower than 32 mm.

By winding the magnetic sheet 100 into the form of the wound magnetic sheet 200, it becomes easy to handle the elongated magnetic sheet 100. For example, it is effective when the elongated magnetic sheet 100 is moved, stored, or unwound and processed (cut or punched). The wound magnetic sheet 200 may be configured by, for example, winding the magnetic sheet 100 around an annular winding core.

Figure 4:
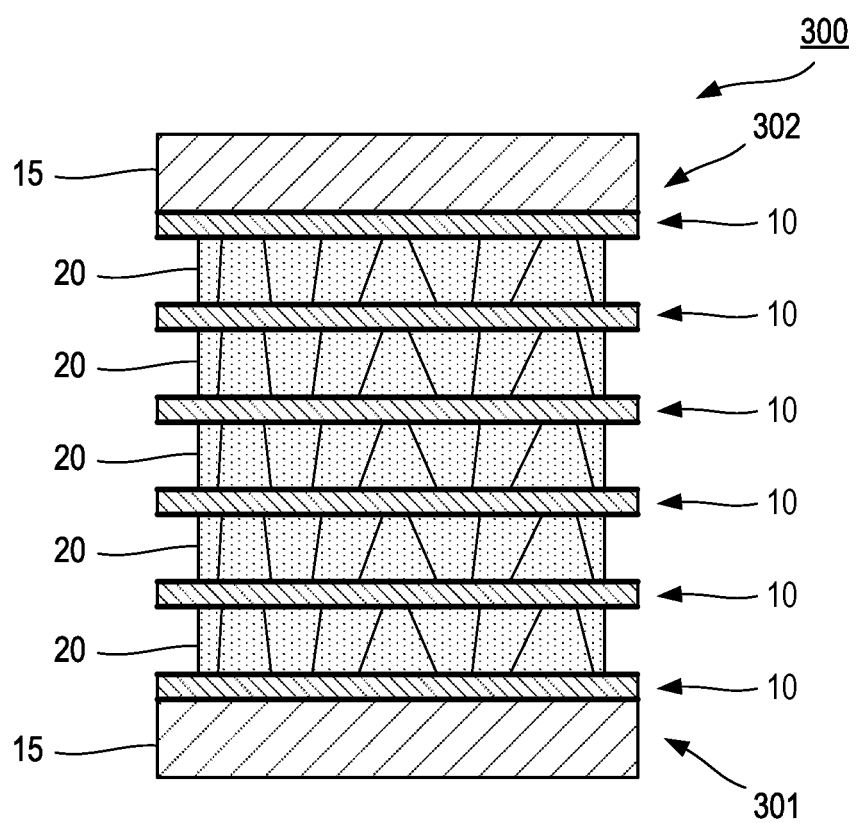
FIG. 4 is a cross-sectional view illustrating a configuration of a multilayer magnetic sheet.

FIG. 4 is a cross-sectional view illustrating a configuration of the multilayer magnetic sheet 300 of the present embodiment.

The multilayer magnetic sheet 300 illustrated in FIG. 4 has a multilayer structure in which five magnetic ribbons 20, six adhesive layers 10, and two resin sheets 15 are layered. The resin sheet 15 may be, for example, a release film or a protective film.

The multilayer magnetic sheet 300 has a structure in which at least the magnetic ribbon 20 and the adhesive layer 10 are alternately layered. The resin sheet 15 is disposed on a first laminate end portion 301 and a second laminate end portion 302 that are both end portions of the multilayer magnetic sheet 300 in the layering direction.

Specifically, the multilayer magnetic sheet 300 has a structure in which the resin sheet 15, the adhesive layer 10, the magnetic ribbon 20, the adhesive layer 10, the magnetic ribbon 20, the adhesive layer 10, the magnetic ribbon 20, the adhesive layer 10, the magnetic ribbon 20, the adhesive layer 10, the magnetic ribbon 20, the adhesive layer 10, and the resin sheet 15 are layered in this order from the lower side to the upper side in FIG. 4.

For example, as illustrated in FIG. 4, the multilayer magnetic sheet 300 may have a multilayer structure in which at least five magnetic ribbons 20 are layered, or may have a multilayer structure in which two or more and four or less magnetic ribbons 20 are layered. The multilayer magnetic sheet 300 may have, for example, a multilayer structure in which six or more magnetic ribbons 20 are layered. The number of the layered magnetic ribbons 20 may be determined as necessary. The number of the layered magnetic ribbons 20 is preferably equal to or more than three, more preferably equal to or more than four, and still more preferably equal to or more than five.

Figure 5:
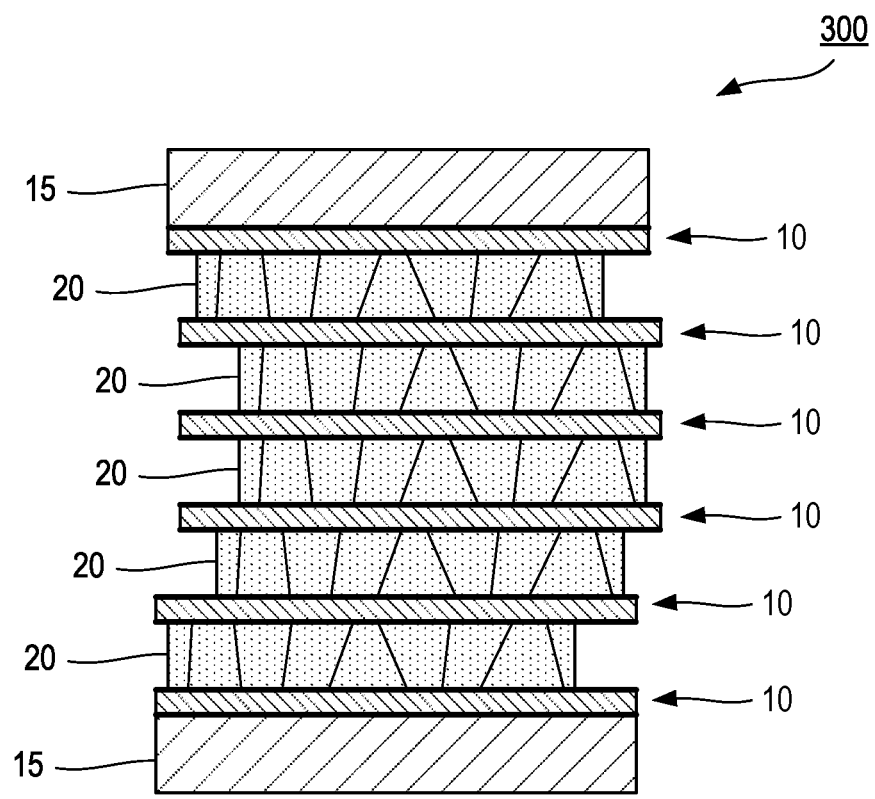
FIG. 5 is a cross-sectional view illustrating another configuration of the multilayer magnetic sheet.

FIG. 5 is a cross-sectional view illustrating another configuration of the multilayer magnetic sheet 300.

For example, as illustrated in FIG. 4, the multilayer magnetic sheet 300 may be obtained by layering five magnetic ribbons 20 arranged at the same position in the width direction. For example, as illustrated in FIG. 5, the multilayer magnetic sheet 300 may be obtained by layering five magnetic ribbons 20 arranged at different positions in the width direction.

Even in a case where the five magnetic ribbons 20 are layered as illustrated in FIG. 5, it is preferable that the relationship of 0 mm<gap C and 0 mm<gap D is satisfied between the magnetic ribbon 20 and the adhesive layer 10 adjacent to each other.

In a case where the multilayer magnetic sheet 300 has the configuration illustrated in FIG. 5, the positions of the cracks 21 in individual five magnetic ribbons 20 hardly match. Therefore, it is easy to make magnetic gaps in the multilayer magnetic sheet 300 uniform.

In addition, in a case where the multilayer magnetic sheet 300 with the configuration illustrated in FIG. 5 is processed by being punched or cut to a desired shape, it is easy to suppress variations in permeability depending on a processing position. Therefore, it is easy to manufacture the multilayer magnetic sheet 300 with stable shield characteristics.

The length of the multilayer magnetic sheet 300 in the longitudinal direction is, for example, 20,000 m. The width of the multilayer magnetic sheet 300 is, for example, 32.5 mm. In a case where the magnetic sheet 100 with a width of 32 mm is used to form the multilayer magnetic sheet 300 as illustrated in FIG. 5, the width of the multilayer magnetic sheet 300 is, for example, 32.5 mm. The length of the multilayer magnetic sheet 300 in the longitudinal direction may be, for example, longer or shorter than 20,000 m. The width of the multilayer magnetic sheet 300 may be, for example, wider or narrower than 32.5 mm. The length of the multilayer magnetic sheet 300 in the longitudinal direction may be set to a desired length depending on a use state. For example, the multilayer magnetic sheet 300 may be cut to a necessary length such as 100 mm, 300 mm, or 1000 mm.

Figure 6:
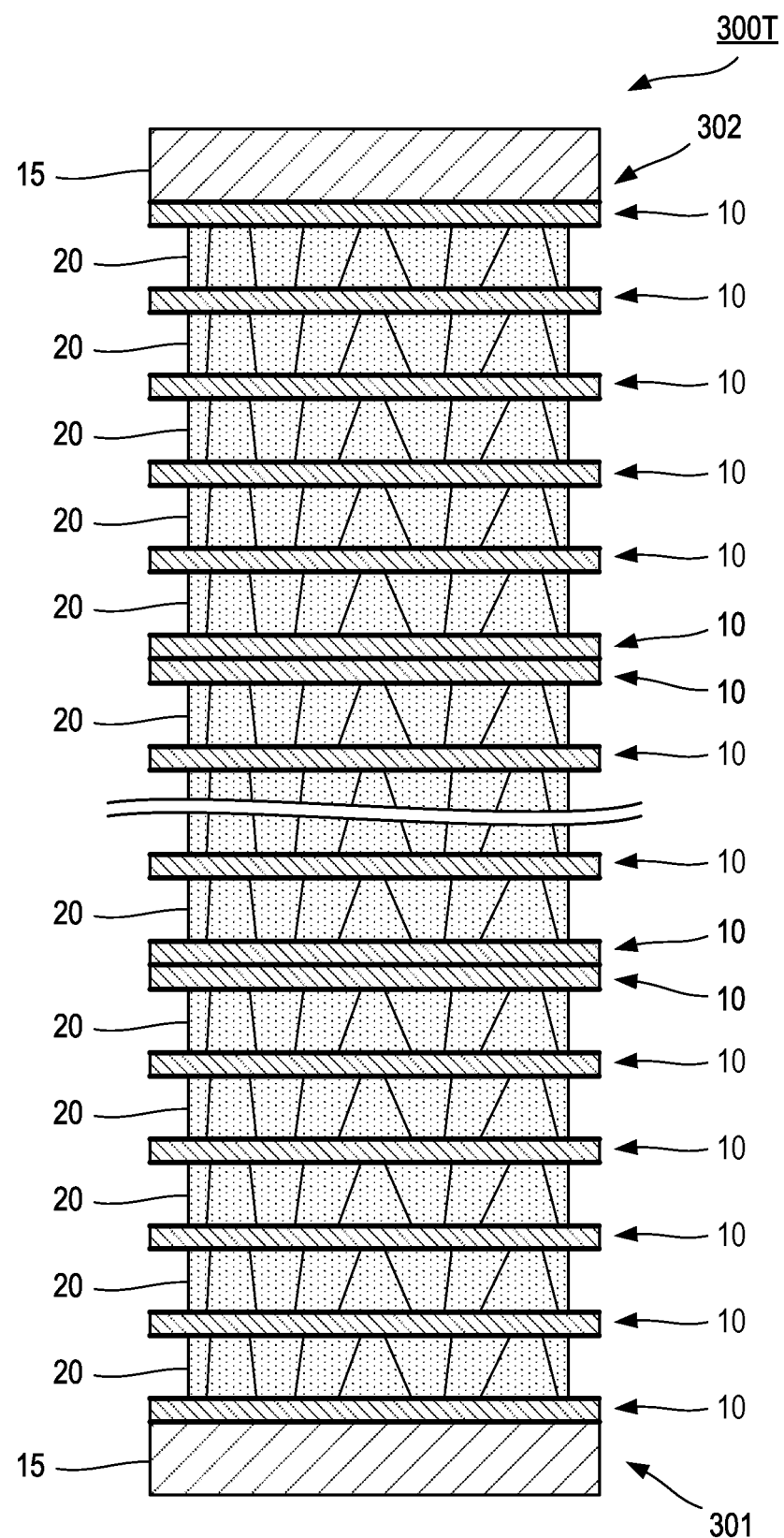
FIG. 6 is a cross-sectional view illustrating a configuration of a multilayer magnetic sheet with a different number of layers.

FIG. 6 is a cross-sectional view illustrating a configuration of the multilayer magnetic sheet 300T with a different number of layers.

As illustrated in FIG. 6, the multilayer magnetic sheet 300T may have, for example, a multilayer structure in which more than ten magnetic ribbons 20 are layered. For example, the multilayer magnetic sheet 300T may have a multilayer structure in which 25 or more and 80 or less magnetic ribbons 20 are layered, or may have a multilayer structure in which more than 80 magnetic ribbons 20 are layered. The multilayer magnetic sheet 300T is a preferable structural example in a multilayer magnetic sheet with a large number of layers. The multilayer magnetic sheet 300T facilitates manufacturing of a multilayer magnetic sheet with a large number of layers.

The multilayer magnetic sheet 300T has a laminated structure in which one or two or more adhesive layers 10 are disposed between adjacent magnetic ribbons 20. In the present embodiment, an example of the laminated structure in which one or two adhesive layers 10 are disposed between adjacent magnetic ribbons 20 will be described. The resin sheet 15 is disposed on the first laminate end portion 301 and the second laminate end portion 302 that are both end portions of the multilayer magnetic sheet 300T in the layering direction.

For example, the resin sheet 15 does not need to be layered on the first laminate end portion 301 or the second laminate end portion 302. For example, the magnetic ribbon 20 may be exposed. For example, an amorphous alloy ribbon or a nanocrystalline alloy ribbon may be bonded to the first laminate end portion 301 or the second laminate end portion 302, or another magnetic material, a metal foil such as aluminum, a resin sheet, or the like may be bonded.

In FIG. 6, regarding first to fifth magnetic ribbons 20 counted from the resin sheet 15, one adhesive layer 10 is disposed between the adjacent magnetic ribbons 20. Two adhesive layers 10 are disposed between the sixth magnetic ribbon 20 counted from the resin sheet 15 and the magnetic ribbon 20 adjacent thereto. One adhesive layer 10 and two adhesive layers 10 are then disposed in the same pattern.

For example, two adhesive layers 10 may be layered in other portions. For example, three or more adhesive layer 10 may be layered, but since the multilayer magnetic sheet 300T becomes thick as a whole, the number of the layered adhesive layers 10 is preferably equal to or less than two.

The length of the multilayer magnetic sheet 300T in the longitudinal direction is set to a predetermined length of, for example, 100 mm or more and 1000 mm or less. The width of the multilayer magnetic sheet 300T is, for example, 32.5 mm. The length of the multilayer magnetic sheet 300T in the longitudinal direction may be longer or shorter than a predetermined length of, for example, 100 mm or more and 1000 mm or less. The width of the multilayer magnetic sheet 300T may be, for example, wider or narrower than 32.5 mm.

Next, a method for manufacturing the magnetic sheet 100, the wound magnetic sheet 200, the multilayer magnetic sheet 300, and the multilayer magnetic sheet 300T according to the present embodiment will be described with reference to FIGS. 7 to 14. First, a method for manufacturing the magnetic sheet 100 and the wound magnetic sheet 200 will be described.

Figure 7:
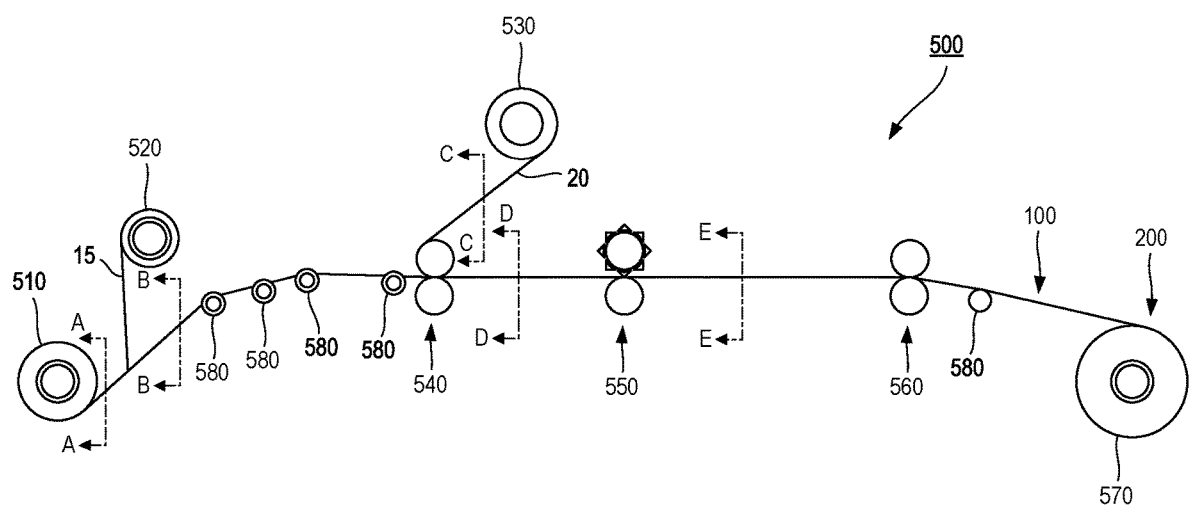
FIG. 7 is a schematic view for explaining a method for manufacturing a magnetic sheet and a wound magnetic sheet.

FIG. 7 is a schematic view for explaining a method for manufacturing the magnetic sheet 100 and the wound magnetic sheet 200.

The magnetic sheet 100 and the wound magnetic sheet 200 are manufactured using a manufacturing apparatus 500 illustrated in FIG. 7. The manufacturing apparatus 500 mainly includes a first unwinding roll 510, a first winding roll 520, a second unwinding roll 530, a bonding roller 540, a crack roller 550, a flattening roller 560, and a third winding roll 570 from upstream to downstream in a manufacturing process. The manufacturing apparatus 500 may further include a plurality of guide rollers 580. The guide roller 580 may also be disposed as desired at a position not illustrated in FIG. 7.

Figure 8:
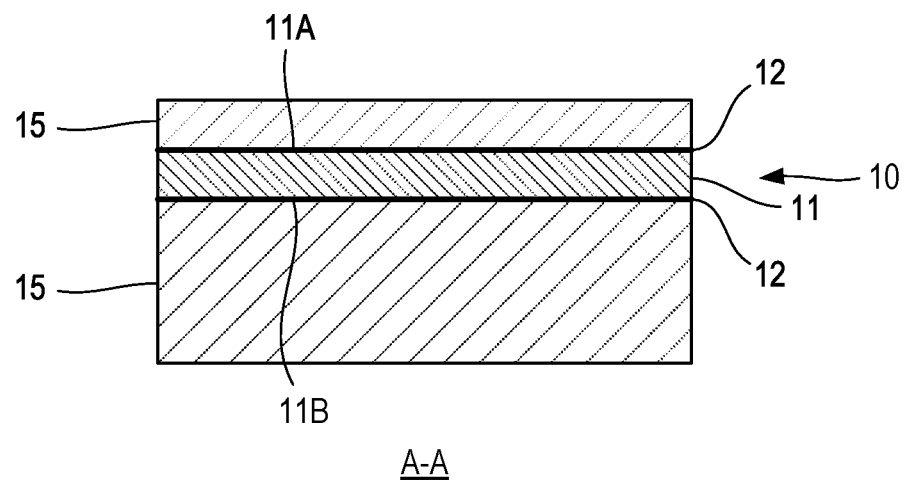
FIG. 8 is a cross-sectional view illustrating a configuration of a laminate supplied from a first unwinding roll.

FIG. 8 is a cross-sectional view taken along line A-A of FIG. 7. FIG. 8 illustrates a configuration of a laminate supplied from the first unwinding roll 510.

As illustrated in FIG. 8, a laminate in which the resin sheet 15 is layered on the first surface 11A and the second surface 11B of the adhesive layer 10 is wound around the first unwinding roll 510. The resin sheet 15 disposed on the first surface 11A is a protective sheet. The resin sheet 15 disposed on the second surface 11B is also referred to as a liner. The resin sheet 15 disposed on the first surface 11A is a sheet thinner than the resin sheet 15 disposed on the second surface 11B.

Figure 9:
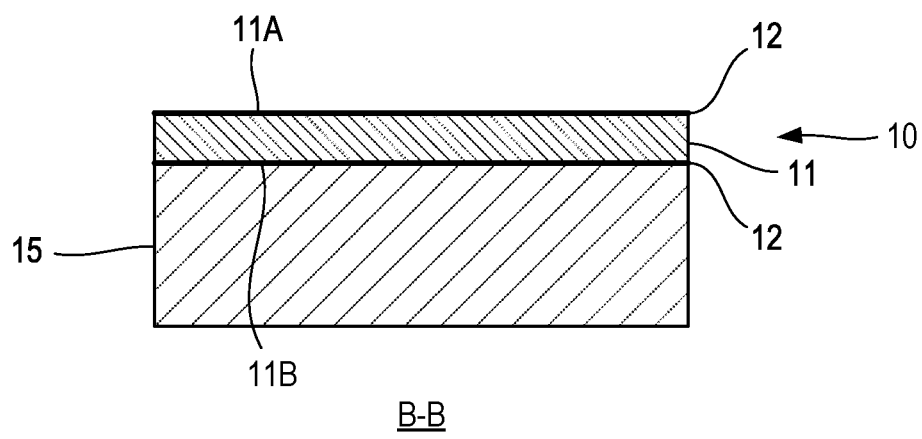
FIG. 9 is a cross-sectional view illustrating a configuration of a laminate which is supplied from the first unwinding roll and from which a resin sheet is peeled.

FIG. 9 is a cross-sectional view taken along line B-B of FIG. 7. FIG. 9 illustrates a configuration of a laminate which is supplied from the first unwinding roll 510 and from which the resin sheet 15 has been peeled.

In the laminate unwound from the first unwinding roll 510, the resin sheet 15 disposed on the first surface 11A is peeled as illustrated in FIG. 9. As illustrated in FIG. 7, the peeled resin sheet 15 is wound around the first winding roll 520.

Figure 10:
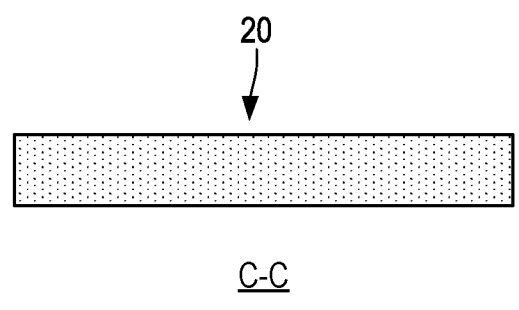
FIG. 10 is a cross-sectional view illustrating a configuration of a magnetic ribbon supplied from a second unwinding roll.

FIG. 10 is a cross-sectional view taken along line C-C of FIG. 7. FIG. 10 illustrates a configuration of the magnetic ribbon 20 supplied from the second unwinding roll 530.

The laminate from which the resin sheet 15 disposed on the first surface 11A has been peeled is guided to the bonding roller 540 by the plurality of guide rollers 580. The magnetic ribbon 20 unwound from the second unwinding roll 530 is further guided to the bonding roller 540. As illustrated in FIG. 10, no crack 21 is formed in the magnetic ribbon 20 guided to the bonding roller 540.

Here, a method for manufacturing the magnetic ribbon 20 unwound from the second unwinding roll 530 will be described. For example, a case where the magnetic ribbon 20 is a nanocrystalline alloy will be described. The magnetic ribbon 20 is manufactured by a manufacturing method including a step of rapidly cooling a molten alloy to obtain an amorphous alloy ribbon capable of nanocrystallization, and a step of thermally treating the amorphous alloy ribbon at a temperature equal to or higher than a crystallization start temperature to form fine crystal grains.

The rapid cooling described above is performed by a single roll method in which a molten metal is discharged onto a rotating cooling roller to be rapidly cooled and solidified. The magnetic ribbon 20 has an elongated shape in which the direction along the rotation direction of the cooling roller is a longitudinal direction. In other words, the magnetic ribbon 20 has an elongated shape extending in the rotation direction of the cooling roller. The length of the magnetic ribbon 20 in the longitudinal direction is, for example, 20,000 m.

The temperature of the above-described heat treatment varies depending on an alloy composition, but is generally equal to or higher than 450° C. The fine crystal grains are, for example, Fe with a body-centered cubic lattice structure in which Si or the like forms a solid solution. The analysis of the fine crystal grains can be performed using X-ray diffraction and a transmission electron microscope.

In the nanocrystalline alloy, at least 50 vol % of the nanocrystalline alloy is occupied by fine crystal grains with an average grain size of 100 nm or less as measured in the largest dimension. Portions other than the fine crystal grains in the nanocrystalline alloy are mainly non-crystalline. For example, the proportion of fine crystal grains may be substantially 100 vol %.

Figure 11:
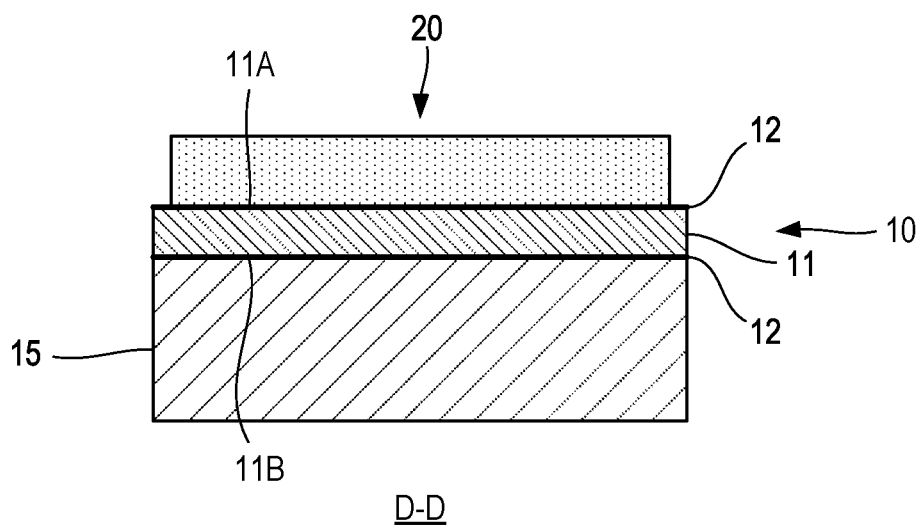
FIG. 11 is a cross-sectional view illustrating a state where the magnetic ribbon is bonded to an adhesive layer by a bonding roller.

FIG. 11 is a cross-sectional view taken along line D-D of FIG. 7. FIG. 11 illustrates a state where the magnetic ribbon 20 is bonded to the adhesive layer 10 by the bonding roller 540.

As illustrated in FIG. 7, the bonding roller 540 presses and bonds the magnetic ribbon 20 to the laminate from which the resin sheet 15 has been peeled. Specifically, the bonding roller 540 guides the laminate and the magnetic ribbon 20 between two rollers arranged to face each other, and presses and bonds the magnetic ribbon 20 to the first surface 11A of the adhesive layer 10 using the two rollers as illustrated in FIG. 11.

For example, the magnetic ribbon 20 may be disposed in such a manner that the center matches the center of the adhesive layer 10 in the width direction, or may be disposed in such a manner that the center is away from the center of the adhesive layer 10 in the width direction. The magnetic ribbon 20 is disposed so as to satisfy the relationship of 0 mm<gap C and 0 mm<gap D (see FIG. 1). As illustrated in FIG. 7, the laminate to which the magnetic ribbon 20 is bonded is guided from the bonding roller 540 to the crack roller 550.

Figure 12:
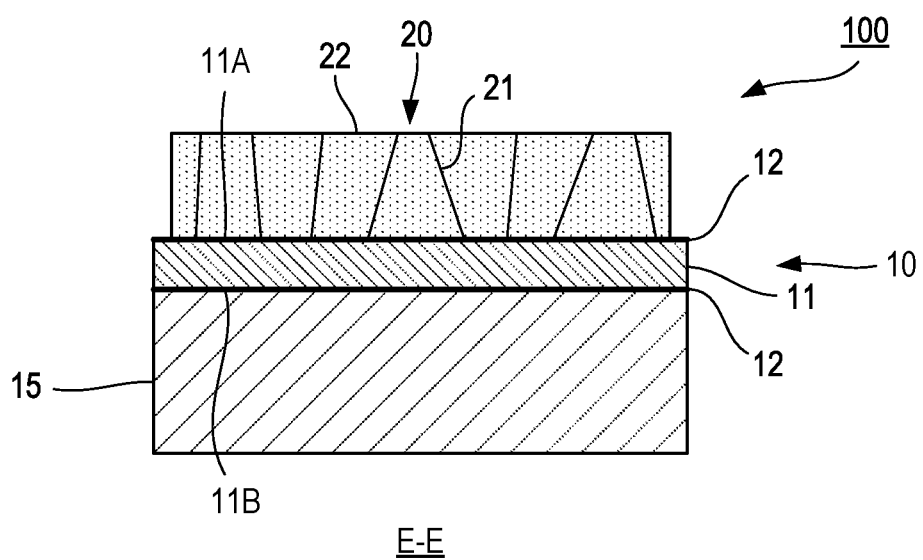
FIG. 12 is a cross-sectional view illustrating a state where a crack is formed in the magnetic ribbon by a crack roller.

FIG. 12 is a cross-sectional view taken along line E-E of FIG. 7. FIG. 12 illustrates a state where the crack 21 is formed in the magnetic ribbon 20 by the crack roller 550.

The crack roller 550 forms the crack 21 in the magnetic ribbon 20 bonded to the adhesive layer 10. Specifically, the crack roller 550 guides the laminate to which the magnetic ribbon 20 is bonded between two rollers arranged to face each other, and presses a roll with projections of the two rollers against the magnetic ribbon 20 to form the crack 21 as illustrated in FIG. 12.

The roller without any projection of the two rollers is disposed on the opposite side of the laminate from the magnetic ribbon 20. The magnetic ribbon 20 having the crack 21 formed therein includes a plurality of small pieces 22. The plurality of small pieces 22 are bonded to the adhesive layer 10.

Here, a configuration of the crack roller 550 will be described. The crack roller 550 is a roller in which a plurality of projection members are arranged on the peripheral surface. The tip of the end portion of the projection member in the crack roller 550 may have, for example, a flat shape, a conical shape, an inverted conical shape with the center recessed, or a cylindrical shape. The plurality of projection members may be arranged regularly or irregularly, for example.

When the elongated magnetic ribbon 20 is pressed against the crack roller 550 or the elongated magnetic ribbon 20 is passed between the two crack rollers 550, the crack 21 is continuously formed in the magnetic ribbon 20. The plurality of cracks 21 are formed in the magnetic ribbon 20 by pressing the projection members of the crack roller 550 against a plurality of locations on the surface of the magnetic ribbon 20.

In forming a crack using the crack roller 550, it is preferable to further form a crack connecting the plurality of cracks 21 in a mesh shape. Specifically, it is preferable to include a step of forming the plurality of cracks 21 by pressing the crack roller 550 against the magnetic ribbon 20 and then forming the crack connecting the plurality of cracks 21 in a mesh shape.

For example, after the crack 21 is formed by directly applying an external force to the magnetic ribbon 20 using the crack roller 550, the second external force may be applied by means such as bending or winding the magnetic ribbon 20 to form the crack connecting the plurality of cracks 21 in a mesh shape. The crack connecting the cracks 21 (the magnetic gap connecting the cracks) is formed with the cracks 21 as starting points of brittle fracture and/or crack fracture.

For example, in the step of forming a crack connecting the plurality of cracks 21 in a mesh shape, the second external force as described above does not need to be applied. In a case where the second external force is not applied, the crack connecting the plurality of cracks 21 in a mesh shape is formed in the process of forming the plurality of cracks 21.

The laminate guided from the crack roller 550 to the flattening roller 560 is subjected to a flattening treatment by the flattening roller 560. The flattening roller 560 is also referred to as a shaping roll.

Specifically, the laminate is guided between two rollers arranged to face each other in the flattening roller 560, and is sandwiched and pressed by the two rollers. As a result, the surface of the magnetic ribbon 20 having the crack 21 formed therein is flattened.

The laminate subjected to the flattening treatment corresponds to the magnetic sheet 100. The magnetic sheet 100 is guided to the third winding roll 570 via the guide roller 580.

The magnetic sheet 100 is wound around the third winding roll 570. The wound magnetic sheet 200 is obtained by winding the magnetic sheet 100 around the third winding roll 570 in a ring shape or a spiral shape.

Figure 13:
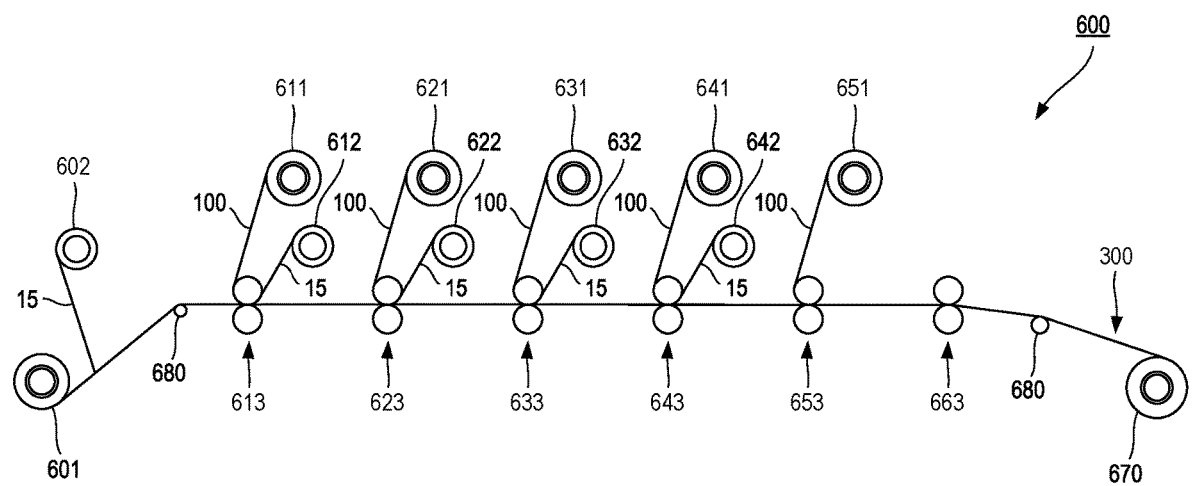
FIG. 13 is a schematic view for explaining a method for manufacturing a multilayer magnetic sheet.

FIG. 13 is a schematic view for explaining a method for manufacturing the multilayer magnetic sheet 300.

The multilayer magnetic sheet 300 is manufactured using a manufacturing apparatus 600 illustrated in FIG. 13. FIG. 13 illustrates the manufacturing apparatus 600 that manufactures the multilayer magnetic sheet 300 including the five layered magnetic ribbons 20.

The manufacturing apparatus 600 mainly includes a supply roll 601, a resin sheet winding roll 602, a first magnetic sheet unwinding roll 611, a first winding roll 612, a first bonding roller 613, a second magnetic sheet unwinding roll 621, a second winding roll 622, a second bonding roller 623, a third magnetic sheet unwinding roll 631, a third winding roll 632, a third bonding roller 633, a fourth magnetic sheet unwinding roll 641, a fourth winding roll 642, a fourth bonding roller 643, a fifth magnetic sheet unwinding roll 651, a fifth bonding roller 653, a flattening roller 663, and a multilayer magnetic sheet winding roll 670 from upstream to downstream in the manufacturing process. The manufacturing apparatus 600 may further include a plurality of guide rollers 680. The guide roller 680 may also be disposed as desired at a position not illustrated in FIG. 13.

For example, the manufacturing apparatus 600 may manufacture the multilayer magnetic sheet 300 in which the number of the layered magnetic ribbons 20 is equal to or more than two and equal to or less than four. For example, the manufacturing apparatus 600 may manufacture the multilayer magnetic sheet 300 in which the number of the layered magnetic ribbons 20 is equal to or more than six. In this case, the number of the first magnetic sheet unwinding roll 611 and the like is changed depending on the number of the magnetic ribbons 20.

The upper limit of the number of the layered magnetic ribbons 20 is not particularly limited. The number of the layered magnetic ribbons 20 may be appropriately determined. In the case of winding the multilayer magnetic sheet 300, if the number of the layered magnetic ribbons 20 is large, it may be difficult to wind the multilayer magnetic sheet 300, or a shape defect may occur when the multilayer magnetic sheet 300 is wound. Therefore, in the case of winding the multilayer magnetic sheet 300, the number of the layered magnetic ribbons 20 is preferably equal to or less than 30. The number of the layered magnetic ribbons 20 is preferably equal to or less than 25, more preferably equal to or less than 20, still more preferably equal to or less than 15, and particularly preferably equal to or less than 10.

As illustrated in FIG. 8, the laminate in which the resin sheet 15 is layered on the first surface 11A and the second surface 11B of the adhesive layer 10 is wound around the supply roll 601.

In the laminate unwound from the supply roll 601, the resin sheet 15 disposed on the first surface 11A is peeled as illustrated in FIG. 9. As illustrated in FIG. 13, the peeled resin sheet 15 is wound around the resin sheet winding roll 602.

The laminate from which the resin sheet 15 disposed on the first surface 11A has been peeled is guided to the first bonding roller 613 by the guide roller 680. Also guided to the first bonding roller 613 is the magnetic sheet 100 unwound from the first magnetic sheet unwinding roll 611.

The first bonding roller 613 presses and bonds the magnetic sheet 100 to the laminate from which the resin sheet 15 has been peeled. Specifically, the first bonding roller 613 guides the laminate and the magnetic sheet 100 between two rollers arranged to face each other, and presses and bonds the magnetic ribbon 20 of the magnetic sheet 100 to the first surface 11A of the adhesive layer 10 using the two rollers as illustrated in FIG. 13.

For example, the magnetic ribbon 20 of the magnetic sheet 100 to be bonded may be disposed in such a manner that the center matches the center of the adhesive layer 10 in the width direction, or may be disposed in such a manner that the center is away from the center of the adhesive layer 10 in the width direction. The magnetic ribbon 20 is disposed so as to satisfy the relationship of 0 mm<gap C and 0 mm<gap D (see FIG. 1).

The resin sheet 15 of the magnetic sheet 100 bonded by the first bonding roller 613 is peeled from the magnetic sheet 100 and wound around the first winding roll 612. The laminate in which the resin sheet 15 has been wound around the first winding roll 612 is guided to the second bonding roller 623. Also guided to the second bonding roller 623 is the magnetic sheet 100 unwound from the second magnetic sheet unwinding roll 621.

The second bonding roller 623 presses and bonds the magnetic sheet 100 to the laminate guided from the first bonding roller 613. For example, the magnetic ribbon 20 of the magnetic sheet 100 to be bonded may be disposed in such a manner that the center matches the center of the adhesive layer 10 of the laminate guided from the first bonding roller 613 in the width direction, or may be disposed in such a manner that the center is away from the center of the adhesive layer 10 in the width direction. The magnetic ribbon 20 is disposed so as to satisfy the relationship of 0 mm<gap C and 0 mm<gap D (see FIG. 1). The resin sheet 15 of the magnetic sheet 100 bonded by the second bonding roller 623 is peeled from the magnetic sheet 100 and wound around the second winding roll 622.

The laminate in which the resin sheet 15 has been wound around the second winding roll 622 is guided to the third bonding roller 633. Also guided to the third bonding roller 633 is the magnetic sheet 100 unwound from the third magnetic sheet unwinding roll 631.

The third bonding roller 633 presses and bonds the magnetic sheet 100 to the laminate guided from the second bonding roller 623. For example, the magnetic ribbon 20 of the magnetic sheet 100 to be bonded may be disposed in such a manner that the center matches the center of the adhesive layer 10 of the laminate guided from the second bonding roller 623 in the width direction, or may be disposed in such a manner that the center is away from the center of the adhesive layer 10 in the width direction. The magnetic ribbon 20 is disposed so as to satisfy the relationship of 0 mm<gap C and 0 mm<gap D (see FIG. 1). The resin sheet 15 of the magnetic sheet 100 bonded by the third bonding roller 633 is peeled from the magnetic sheet 100 and wound around the third winding roll 632.

The laminate in which the resin sheet 15 has been wound around the third winding roll 632 is guided to the fourth bonding roller 643. Also guided to the fourth bonding roller 643 is the magnetic sheet 100 unwound from the fourth magnetic sheet unwinding roll 641.

The fourth bonding roller 643 presses and bonds the magnetic sheet 100 to the laminate guided from the third bonding roller 633. For example, the magnetic ribbon 20 of the magnetic sheet 100 to be bonded may be disposed in such a manner that the center matches the center of the adhesive layer 10 of the laminate guided from the third bonding roller 633 in the width direction, or may be disposed in such a manner that the center is away from the center of the adhesive layer 10 in the width direction. The magnetic ribbon 20 is disposed so as to satisfy the relationship of 0 mm<gap C and 0 mm<gap D (see FIG. 1). The resin sheet 15 of the magnetic sheet 100 bonded by the fourth bonding roller 643 is peeled from the magnetic sheet 100 and wound around the fourth winding roll 642.

The laminate in which the resin sheet 15 has been wound around the fourth winding roll 642 is guided to the fifth bonding roller 653. Also guided to the fifth bonding roller 653 is the magnetic sheet 100 unwound from the fifth magnetic sheet unwinding roll 651.

The fifth bonding roller 653 presses and bonds the magnetic sheet 100 to the laminate guided from the fourth bonding roller 643. For example, the magnetic ribbon 20 of the magnetic sheet 100 to be bonded may be disposed in such a manner that the center matches the center of the adhesive layer 10 of the laminate guided from the fourth bonding roller 643 in the width direction, or may be disposed in such a manner that the center is away from the center of the adhesive layer 10 in the width direction. The magnetic ribbon 20 is disposed so as to satisfy the relationship of 0 mm<gap C and 0 mm<gap D (see FIG. 1). The laminate guided from the fifth bonding roller 653 to the flattening roller 663 is subjected to the flattening treatment by the flattening roller 663.

The relationship between the magnetic ribbon 20 and the adhesive layer 10 preferably satisfies the relationship of 0 mm<gap C and 0 mm<gap D (see FIG. 1) as described above. However, in the step of layering the magnetic sheet 100 on the laminate, the positional relationship may be deviated. When the positional relationship is deviated, for example, the gap C may become negative in the relationship between the magnetic ribbon 20 and the adhesive layer 10. That is, on one surface side of the magnetic ribbon 20, the end portion of the magnetic ribbon 20 may project from the end portion of the adhesive layer 10. Even in a case where the end portion of the magnetic ribbon 20 projects from the end portion of the adhesive layer 10 on the one surface side of the magnetic ribbon 20, if the relationship between the magnetic ribbon 20 and the adhesive layer 10 satisfies the relationship of 0 mm<gap C and 0 mm<gap D (see FIG. 1) on the other surface side of the magnetic ribbon 20, the magnetic ribbon 20 can be kept being bonded to the adhesive layer 10.

The laminate subjected to the flattening treatment corresponds to the multilayer magnetic sheet 300 illustrated in FIG. 4. The multilayer magnetic sheet 300 is guided to the multilayer magnetic sheet winding roll 670 via the guide roller 680. The multilayer magnetic sheet 300 is wound around the multilayer magnetic sheet winding roll 670.

The multilayer magnetic sheet 300 may be cut to a required length, for example, other than being wound around the multilayer magnetic sheet winding roll 670.

Figure 14:
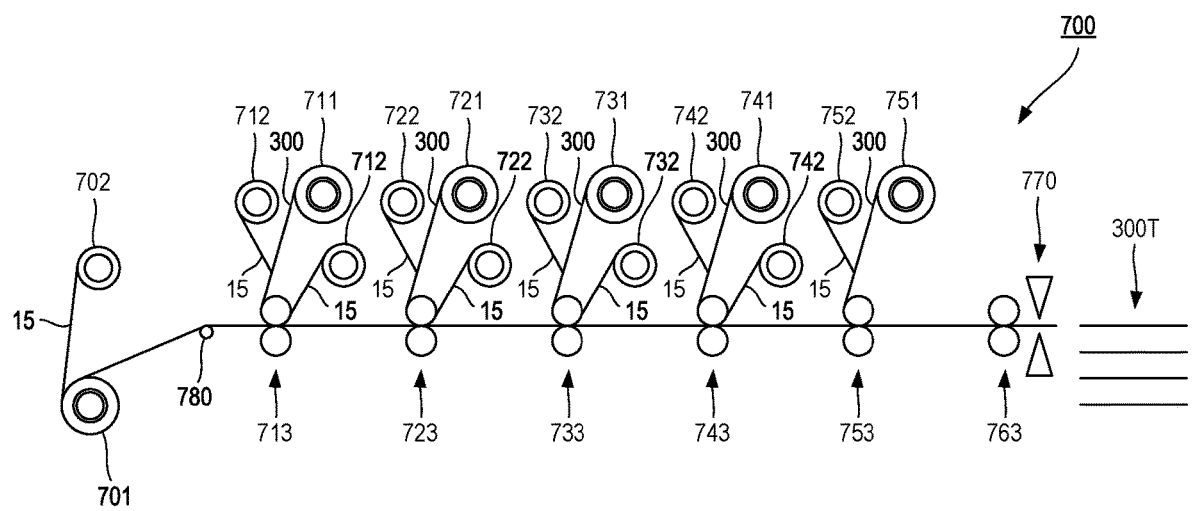
FIG. 14 is a schematic view for explaining the method for manufacturing a multilayer magnetic sheet.

FIG. 14 is a schematic view for explaining a method for manufacturing the multilayer magnetic sheet 300T.

The multilayer magnetic sheet 300T is manufactured using a manufacturing apparatus 700 illustrated in FIG. 14. FIG. 14 illustrates the manufacturing apparatus 700 that manufactures the multilayer magnetic sheet 300T including the 25 layered magnetic ribbons 20.

The method for manufacturing the multilayer magnetic sheet 300T is a method for manufacturing the multilayer magnetic sheet 300T by layering a plurality of multilayer magnetic sheets 300. The number of the layered magnetic ribbons 20 in the multilayer magnetic sheet 300T can be adjusted by the number of the multilayer magnetic sheets 300 to be used and the number of the layered magnetic ribbons 20 in the multilayer magnetic sheet 300 to be used.

The manufacturing apparatus 700 mainly includes a supply roll 701, a resin sheet winding roll 702, a first multilayer magnetic sheet unwinding roll 711, two first winding rolls 712, a first bonding roller 713, a second multilayer magnetic sheet unwinding roll 721, two second winding rolls 722, a second bonding roller 723, a third multilayer magnetic sheet unwinding roll 731, two third winding rolls 732, a third bonding roller 733, a fourth multilayer magnetic sheet unwinding roll 741, two fourth winding rolls 742, a fourth bonding roller 743, a fifth multilayer magnetic sheet unwinding roll 751, a fifth winding roll 752, a fifth bonding roller 753, a flattening roller 763, and a cutting unit 770 from upstream to downstream in the manufacturing process. The manufacturing apparatus 700 may further include a plurality of guide rollers 780. The guide roller 780 may also be disposed as desired at a position not illustrated in FIG. 13. The number of the first multilayer magnetic sheet unwinding roll 711 and the like is changed depending on the number of the magnetic ribbons 20.

For example, the manufacturing apparatus 700 may manufacture the multilayer magnetic sheet 300T in which the number of the layered magnetic ribbons 20 is equal to or more than 25 and equal to or less than 80. For example, the manufacturing apparatus 700 may manufacture the multilayer magnetic sheet 300T in which the number of the layered magnetic ribbons 20 is more than 80, or may manufacture the multilayer magnetic sheet 300T in which the number of the layered magnetic ribbons 20 is less than 25. The number of the layered magnetic ribbons 20 in the multilayer magnetic sheet 300T is preferably equal to or more than 10, and more preferably equal to or more than 15. The total of the layered magnetic ribbons 20 is preferably equal to or less than 200. In this case, the number of the first multilayer magnetic sheet unwinding roll 711 and the like is changed depending on the number of the layered magnetic ribbons 20 in the multilayer magnetic sheet 300T. The number of the layered magnetic ribbons 20 in the multilayer magnetic sheet 300 is changed depending on the number of the layered magnetic ribbons 20 in the multilayer magnetic sheet 300T.

As illustrated in FIG. 8, the laminate in which the resin sheet 15 is layered on the first surface 11A and the second surface 11B of the adhesive layer 10 is wound around the supply roll 701.

In the laminate unwound from the supply roll 701, the resin sheet 15 disposed on the first surface 11A is peeled as illustrated in FIG. 9. As illustrated in FIG. 14, the peeled resin sheet 15 is wound around the resin sheet winding roll 702.

The laminate from which the resin sheet 15 disposed on the first surface 11A has been peeled is guided to the first bonding roller 713 by the guide roller 780. Also guided to the first bonding roller 713 is the multilayer magnetic sheet 300 unwound from the first multilayer magnetic sheet unwinding roll 711.

For example, a multilayer magnetic sheet unwinding roll may be used as the supply roll 701. In the case of using the multilayer magnetic sheet unwinding roll as the supply roll 701, in the unwound multilayer magnetic sheet, one of the two resin sheets 15 is peeled and then the multilayer magnetic sheet is guided to the first bonding roller 713.

In the multilayer magnetic sheet 300 guided to the first bonding roller 713, the resin sheet 15 facing the laminate guided from the supply roll 701 among the two resin sheets 15 is peeled. The peeled resin sheet 15 is wound around the first winding roll 712.

The first bonding roller 713 presses and bonds the multilayer magnetic sheet 300 from which the resin sheet 15 has been peeled to the laminate from which the resin sheet 15 has been peeled. Specifically, the first bonding roller 713 guides the laminate and the multilayer magnetic sheet 300 between two rollers arranged to face each other, and presses and bonds the magnetic ribbon 20 of the multilayer magnetic sheet 300 to the first surface 11A of the adhesive layer 10 using the two rollers as illustrated in FIG. 14.

For example, the magnetic ribbon 20 of the multilayer magnetic sheet 300 to be bonded may be disposed in such a manner that the center matches the center of the adhesive layer 10 in the width direction, or may be disposed in such a manner that the center is away from the center of the adhesive layer 10 in the width direction. The magnetic ribbon 20 is disposed so as to satisfy the relationship of 0 mm<gap C and 0 mm<gap D (see FIG. 1).

The remaining resin sheet 15 of the multilayer magnetic sheet 300 bonded by the first bonding roller 713 is peeled from the multilayer magnetic sheet 300 and wound around the first winding roll 712. The laminate is guided to the second bonding roller 723. Also guided to the second bonding roller 723 is the multilayer magnetic sheet 300 unwound from the second multilayer magnetic sheet unwinding roll 721.

In the multilayer magnetic sheet 300 guided to the second bonding roller 723, the resin sheet 15 facing the laminate guided from the first bonding roller 713 among the two resin sheets 15 is peeled. The peeled resin sheet 15 is wound around the second winding roll 722.

The second bonding roller 723 presses and bonds the multilayer magnetic sheet 300 to the laminate guided from the first bonding roller 713. For example, the magnetic ribbon 20 of the multilayer magnetic sheet 300 to be bonded may be disposed in such a manner that the center matches the center of the adhesive layer 10 of the laminate guided from the first bonding roller 713 in the width direction, or may be disposed in such a manner that the center is away from the center of the adhesive layer 10 in the width direction. The magnetic ribbon 20 is disposed so as to satisfy the relationship of 0 mm<gap C and 0 mm<gap D (see FIG. 1).

The remaining resin sheet 15 of the multilayer magnetic sheet 300 bonded by the second bonding roller 723 is peeled from the multilayer magnetic sheet 300 and wound around the second winding roll 722.

The laminate is then guided to the third bonding roller 733. Also guided to the third bonding roller 733 is the multilayer magnetic sheet 300 unwound from the third multilayer magnetic sheet unwinding roll 731.

In the multilayer magnetic sheet 300 guided to the third bonding roller 733, the resin sheet 15 facing the laminate guided from the second bonding roller 723 among the two resin sheets 15 is peeled. The peeled resin sheet 15 is wound around the third winding roll 732.

The third bonding roller 733 presses and bonds the multilayer magnetic sheet 300 to the laminate guided from the second bonding roller 723. For example, the magnetic ribbon 20 of the multilayer magnetic sheet 300 to be bonded may be disposed in such a manner that the center matches the center of the adhesive layer 10 of the laminate guided from the second bonding roller 723 in the width direction, or may be disposed in such a manner that the center is away from the center of the adhesive layer 10 in the width direction. The magnetic ribbon 20 is disposed so as to satisfy the relationship of 0 mm<gap C and 0 mm<gap D (see FIG. 1).

The remaining resin sheet 15 of the multilayer magnetic sheet 300 bonded by the third bonding roller 733 is peeled from the multilayer magnetic sheet 300 and wound around the third winding roll 732.

The laminate is then guided to the fourth bonding roller 743. Also guided to the fourth bonding roller 743 is the multilayer magnetic sheet 300 unwound from the fourth multilayer magnetic sheet unwinding roll 741.

In the multilayer magnetic sheet 300 guided to the fourth bonding roller 743, the resin sheet 15 facing the laminate guided from the third bonding roller 733 among the two resin sheets 15 is peeled. The peeled resin sheet 15 is wound around the fourth winding roll 742.

The fourth bonding roller 743 presses and bonds the multilayer magnetic sheet 300 to the laminate guided from the third bonding roller 733. For example, the magnetic ribbon 20 of the multilayer magnetic sheet 300 to be bonded may be disposed in such a manner that the center matches the center of the adhesive layer 10 of the laminate guided from the third bonding roller 733 in the width direction, or may be disposed in such a manner that the center is away from the center of the adhesive layer 10 in the width direction. The magnetic ribbon 20 is disposed so as to satisfy the relationship of 0 mm<gap C and 0 mm<gap D (see FIG. 1).

The remaining resin sheet 15 of the multilayer magnetic sheet 300 bonded by the fourth bonding roller 743 is peeled from the multilayer magnetic sheet 300 and wound around the fourth winding roll 742.

The laminate is then guided to the fifth bonding roller 753. Also guided to the fifth bonding roller 753 is the multilayer magnetic sheet 300 unwound from the fifth multilayer magnetic sheet unwinding roll 751.

In the multilayer magnetic sheet 300 guided to the fifth bonding roller 753, the resin sheet 15 facing the laminate guided from the fourth bonding roller 743 among the two resin sheets 15 is peeled. The peeled resin sheet 15 is wound around the fifth winding roll 752.

The fifth bonding roller 753 presses and bonds the multilayer magnetic sheet 300 to the laminate guided from the fourth bonding roller 743. For example, the magnetic ribbon 20 of the multilayer magnetic sheet 300 to be bonded may be disposed in such a manner that the center matches the center of the adhesive layer 10 of the laminate guided from the fourth bonding roller 743 in the width direction, or may be disposed in such a manner that the center is away from the center of the adhesive layer 10 in the width direction. The magnetic ribbon 20 is disposed so as to satisfy the relationship of 0 mm<gap C and 0 mm<gap D (see FIG. 1).

The laminate guided from the fifth bonding roller 753 to the flattening roller 763 is subjected to the flattening treatment by the flattening roller 763.

For example, a step of bonding an amorphous alloy ribbon, a nanocrystalline alloy ribbon, another magnetic material, a metal foil such as aluminum, a resin sheet, or the like as an outer layer may be provided after the fifth bonding roller 753. In this case, the remaining resin sheet 15 of the multilayer magnetic sheet 300 bonded by the fifth bonding roller 753 may be peeled from the multilayer magnetic sheet 300 and guided to a sixth bonding roller (not illustrated). An outer layer material selected from an amorphous alloy ribbon, a nanocrystalline alloy ribbon, another magnetic material, a metal foil such as aluminum, a resin sheet, and the like may be guided to the sixth bonding roller and bonded.

The laminate subjected to the flattening treatment corresponds to the multilayer magnetic sheet 300T illustrated in FIG. 6. The multilayer magnetic sheet 300T is cut to a desired length at the cutting unit 770. Examples of the desired length include a length of 100 mm or more and 1000 mm or less. The length of the multilayer magnetic sheet 300T can be appropriately changed on the basis of the specifications required for the multilayer magnetic sheet 300T. In a case where the multilayer magnetic sheet 300T has the number of layers that can be wound, the multilayer magnetic sheet 300T can be wound. Thereafter, the multilayer magnetic sheet 300T may be cut to a desired length and used.

Here, the multilayer magnetic sheet 300 with five magnetic ribbons 20 is layered five times to manufacture the multilayer magnetic sheet 300T having the 25 layered magnetic ribbons 20. However, for example, the multilayer magnetic sheet 300T having the 25 layered magnetic ribbons 20 may be further layered to manufacture the multilayer magnetic sheet 300T having the 50 layered magnetic ribbons 20.

By setting the number of the layered magnetic ribbons 20 in the multilayer magnetic sheet 300T to, for example, 25 or more and about 80 or less, the multilayer magnetic sheet 300T can be used for contactless charging of a moving body such as an automobile. The number of the layered magnetic ribbons 20 in the multilayer magnetic sheet 300T is not particularly limited, and may be, for example, equal to or more than 80, or equal to or less than 25.

On the basis of the number of the layered magnetic ribbons 20 in the multilayer magnetic sheet 300T to be finally manufactured, the number of the layered magnetic ribbons 20 in the multilayer magnetic sheet 300 to be layered may be changed.

The numbers of the layered magnetic ribbons 20 in the plurality of multilayer magnetic sheets 300 to be layered may be different from each other. In other words, the multilayer magnetic sheet 300T may be manufactured by a combination of a plurality of multilayer magnetic sheets 300 with different numbers of the layered magnetic ribbons 20.

By manufacturing the multilayer magnetic sheet 300T with the manufacturing apparatus 700, the apparatus can be easily downsized as compared with the case of manufacturing the multilayer magnetic sheet 300T with the manufacturing apparatus 600. In the case of manufacturing the multilayer magnetic sheet 300T with the manufacturing apparatus 600, it is necessary to arrange the first magnetic sheet unwinding roll 611 and the like around which the magnetic sheet 100 is wound, whose number is equal to the number of the layered magnetic ribbons 20, so that the manufacturing apparatus 600 tends to be enlarged.

On the other hand, since the manufacturing apparatus 700 uses the first multilayer magnetic sheet unwinding roll 711 and the like around which the multilayer magnetic sheet 300 is wound, it is easy to downsize the manufacturing apparatus. In other words, the multilayer magnetic sheet 300T can be easily manufactured.

According to the magnetic sheet 100, the wound magnetic sheet 200, the multilayer magnetic sheet 300, and the multilayer magnetic sheet 300T with the configurations described above, the width A of the area of the adhesive layer 10 where the adhesive 12 is provided is wider than the width B of the magnetic ribbon 20. Therefore, even if meandering occurs in the adhesive layer 10 or the magnetic ribbon 20 when the magnetic ribbon 20 is bonded to the adhesive layer 10, the adhesive 12 of the adhesive layer 10 is easily disposed on the entire surface of the magnetic ribbon 20.

By setting the value (width A−width B) obtained by subtracting the width B from the width A to 0.2 mm or more, it is easy to prevent the occurrence of a portion where the adhesive 12 is not disposed on the magnetic ribbon 20 when the magnetic ribbon 20 is bonded to the adhesive layer 10. By setting the value (width A−width B) obtained by subtracting the width B from the width A to 3 mm or less, it is easy to prevent the portion of the magnetic sheet 100 where the magnetic ribbon 20 is not disposed from becoming large. In addition, when the magnetic sheets 100 are arranged in parallel, it is easy to prevent the distance (the magnetic gap) between the magnetic ribbons 20 from increasing.

By satisfying the relationship of 0 mm<gap C and 0 mm<gap D, when the magnetic ribbon 20 is bonded to the adhesive layer 10, the magnetic ribbon 20 is prevented from projecting from the area where the adhesive 12 is provided. Therefore, it is easy to prevent a portion in which the adhesive 12 is not disposed from being formed in the magnetic ribbon 20.

By using an amorphous alloy ribbon or a nanocrystalline alloy ribbon as the magnetic ribbon 20, the magnetic ribbon 20 can be made a soft magnetic ribbon. In addition, the magnetic ribbon 20 can be formed using an alloy.

By using a member manufactured by a single roll method as the magnetic ribbon 20, the magnetic ribbon 20 can be easily formed in an elongated shape.

By including a plurality of small pieces 22 in the magnetic ribbon 20, the characteristics of the magnetic sheet 100, the wound magnetic sheet 200, the multilayer magnetic sheet 300, and the multilayer magnetic sheet 300T can be easily improved. Specifically, the Q value can be easily improved in a case where the magnetic sheet 100, the wound magnetic sheet 200, the multilayer magnetic sheet 300, and the multilayer magnetic sheet 300T are used as magnetic bodies for an inductor. In a case where the magnetic sheet 100, the wound magnetic sheet 200, the multilayer magnetic sheet 300, and the multilayer magnetic sheet 300T are used as magnetic bodies for magnetic shielding, it is easy to divide the current path of the magnetic ribbon 20 to reduce the eddy current loss.

By winding the magnetic sheet 100 in a ring shape or a spiral shape to form the wound magnetic sheet 200, it is easy to perform a conveyance operation after manufacturing.

The first laminate end portion 301 and/or the second laminate end portion 302 may be provided with the resin sheet 15. In this case, the multilayer magnetic sheet 300 and the multilayer magnetic sheet 300T manufactured can be easily protected. For example, when the multilayer magnetic sheet 300 and the multilayer magnetic sheet 300T manufactured are conveyed, it is easy to prevent the adhesive layer 10 and the magnetic ribbon 20 from being damaged.

For example, an amorphous alloy ribbon or a nanocrystalline alloy ribbon may be bonded to the first laminate end portion 301, or another magnetic material, a metal foil such as aluminum, or a resin sheet may be bonded to the first laminate end portion 301.

The two or more layered adhesive layers 10 may be disposed between at least one of the magnetic ribbons 20 and an adjacent one of the magnetic ribbons 20. In this case, the multilayer magnetic sheet 300T having the ten or more layered magnetic ribbons 20 can be easily manufactured.

Note that the technical scope of the present disclosure is not limited to the above embodiments, and various modifications can be made without departing from the gist of the present disclosure. For example, the magnetic sheet 100, the wound magnetic sheet 200, the multilayer magnetic sheet 300, and the multilayer magnetic sheet 300T according to the present disclosure can be used as induction elements or the like.

What is claimed is:

1. A magnetic sheet comprising:
an adhesive layer that includes a support formed in a band shape and an adhesive provided on at least one of a first surface or a second surface of the support; and
a magnetic ribbon that is formed in a band shape using a magnetic material and is bonded to the adhesive on the adhesive layer,
wherein the magnetic ribbon includes a plurality of pieces, and
wherein width A as a dimension of the adhesive layer in a direction intersecting a longitudinal direction of the adhesive layer and width B as a dimension of the magnetic ribbon in a direction intersecting a longitudinal direction of the magnetic ribbon satisfy a relationship of 0.2 mm≤(width A−width B)≤3 mm.

2. The magnetic sheet according to claim 1,
wherein in a cross-sectional view taken along a direction intersecting the longitudinal direction of the adhesive layer, a gap C as a distance from a first adhesive layer end portion of the adhesive layer to a first ribbon end portion that is an end portion of the magnetic ribbon on a same side as the first adhesive layer end portion and a gap D as a distance from a second adhesive layer end portion that is an end portion opposite to the first adhesive layer end portion of the adhesive layer to a second ribbon end portion that is an end portion of the magnetic ribbon on a same side as the second adhesive layer end portion satisfy a relationship of 0 mm<gap C and 0 mm<gap D.

3. The magnetic sheet according to claim 1,
wherein the magnetic ribbon is a ribbon formed of an amorphous alloy or a nanocrystalline alloy.

4. The magnetic sheet according to claim 1,
wherein the magnetic ribbon is a member manufactured by a single roll method in which a molten metal is discharged onto a cooling roller in rotation to be rapidly cooled and solidified,
wherein the longitudinal direction of the magnetic ribbon is along a rotation direction of the cooling roller, and
wherein the width B is a dimension in a direction orthogonal to the longitudinal direction of the magnetic ribbon.

5. A wound magnetic sheet formed by winding the magnetic sheet according to claim 1 in a ring shape or a spiral shape.

6. A multilayer magnetic sheet comprising:
adhesive layers each of which includes a support formed in a band shape and an adhesive provided on a first surface and a second surface of the support; and
magnetic ribbons each of which is formed in a band shape using a magnetic material,
wherein each of the magnetic ribbon includes a plurality of pieces,
wherein each of the magnetic ribbons is disposed between the adhesive layers adjacent to each other to be bonded to the adhesive on each of the adhesive layers, and
wherein width A as a dimension of the adhesive layers in a direction intersecting a longitudinal direction of the adhesive layers and width B as a dimension of the magnetic ribbons in a direction intersecting a longitudinal direction of the magnetic ribbons satisfy a relationship of 0.2 mm≤(width A−width B)≤3 mm.

7. The multilayer magnetic sheet according to claim 6,
wherein the magnetic ribbons each are a ribbon formed of an amorphous alloy or a nanocrystalline alloy.

8. The multilayer magnetic sheet according to claim 6,
wherein the magnetic ribbons each are a member manufactured by a single roll method in which a molten metal is discharged onto a cooling roller in rotation to be rapidly cooled and solidified,
wherein the longitudinal direction of the magnetic ribbons is along a rotation direction of the cooling roller, and
wherein the width B is a dimension in a direction orthogonal to the longitudinal direction of the magnetic ribbons.

9. The multilayer magnetic sheet according to claim 6,
wherein in a layering direction in which the magnetic ribbons and the adhesive layers are layered, a first laminate end portion and/or a second laminate end portion opposite to the first laminate end portion is provided with a resin sheet that is a film-shaped member formed using a resin, and
wherein the resin sheet is bonded to the adhesive on the adhesive layers.

10. The multilayer magnetic sheet according to claim 6,
wherein ten or more of the magnetic ribbons are layered with at least one of the adhesive layers interposed therebetween, and
wherein two or more of the adhesive layers are disposed between at least one of the magnetic ribbons and an adjacent one of the magnetic ribbons.

* * * * *